June 3, 1924.
H. ROSENTHAL
1,496,433
METHOD OF AND MEANS FOR CONTROLLING ELECTRIC MOTORS
Original Filed Dec. 29, 1919
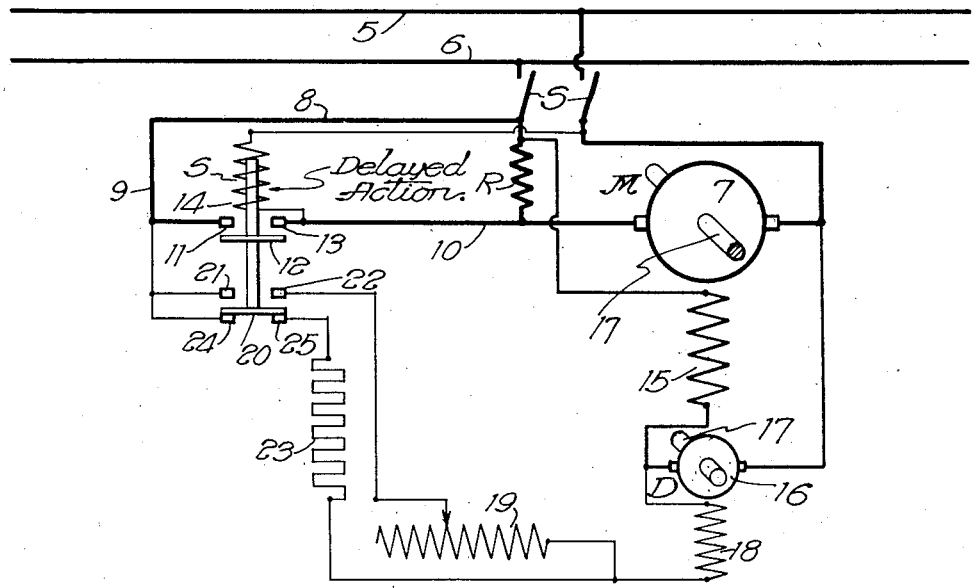
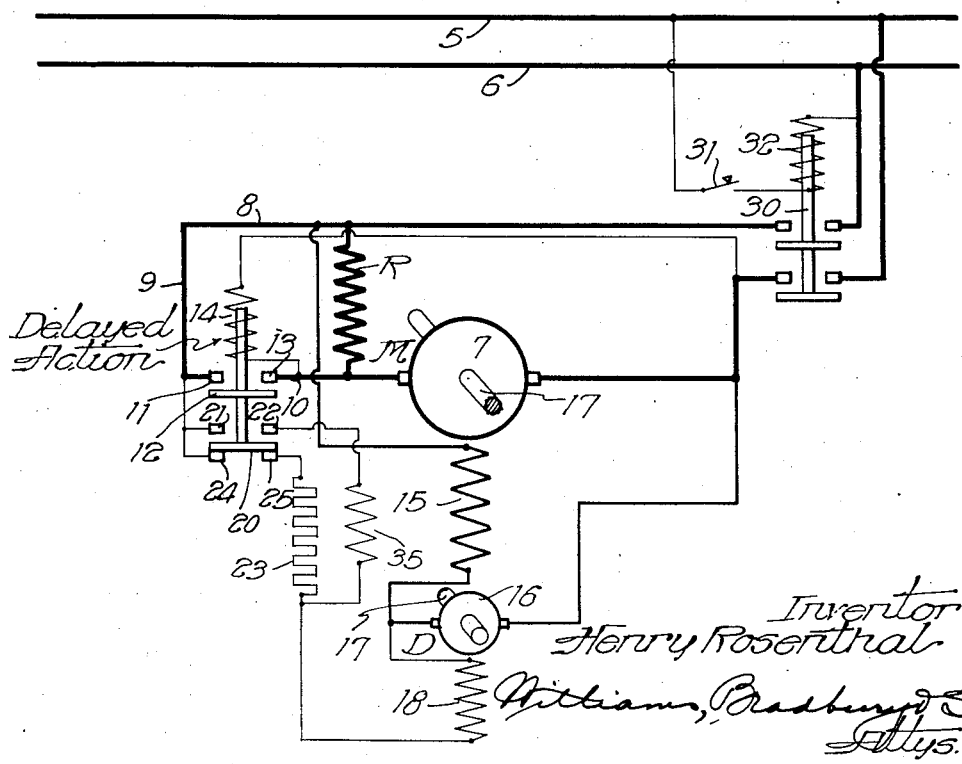
Inventor
Henry Rosenthal
Williams, Bradbury Ser
Attys.

Patented June 3, 1924.

1,496,433

UNITED STATES PATENT OFFICE.

HENRY ROSENTHAL, OF CHICAGO, ILLINOIS, ASSIGNOR TO GEORGE B. BURRAGE AND LEIGH J. STEPHENSON, BOTH OF CHICAGO, ILLINOIS.

METHOD OF AND MEANS FOR CONTROLLING ELECTRIC MOTORS.

Application filed December 29, 1919, Serial No. 348,161. Renewed November 2, 1923.

*To all whom it may concern:*

Be it known that I, HENRY ROSENTHAL, a citizen of the United States, residing at Chicago, in the county of Cook and State of Illinois, have invented a certain new and useful Improvement in Methods of and Means for Controlling Electric Motors, of which the following is a full, clear, concise, and exact description, reference being had to the accompanying drawing, forming a part of this specification.

My invention relates to improvements in method of and means for controlling electric motors, and is especially concerned with the provision of a novel method of and means for controlling a dynamo electric machine, such as that disclosed in the patent of Leigh J. Stephenson, No. 1,322,471 of November 18, 1919.

The objects of my invention are:

First: To provide novel means for controlling the operation of the motor whereby it can be controlled to operate at different speeds, to accelerate at different rates, and under certain conditions to function as a generator to return current to the line from which it receives its energy.

Second: To provide means for controlling the motor as described above, which will require a minimum number of contactors for controlling its operation.

Third: To provide means for controlling the operation of the motor whereby the starting resistance may be eliminated in a single step without disturbing the speed of the motor, and Fourth: To provide a novel method of controlling the starting of a motor.

Other objects will definitely appear as this description progresses, reference being had to the accompanying drawings in which:

Figure 1 is a diagrammatic view of the apparatus which I employ, and the electrical connections thereof, and Figure 2 is a diagrammatic view of a modified embodiment of my invention.

The patent to Leigh J. Stephenson, referred to above, discloses a dynamo electric machine comprising a motor having a field winding which is connected in series with a regulating dynamo, the counterelectromotive force of which opposes the potential impressed upon the field winding circuit. The armatures of the motor and the regulating dynamo are connected so that the speed of the regulating dynamo will always be constantly proportional to the speed of the motor. The regulating dynamo is provided with a field winding which is connected in parallel with the field winding of the motor. An adjustable resistance is connected in series with the field winding of the regulating dynamo. A starting resistance is connected in series with the armature of the motor.

In starting the motor shown in the Stephenson patent, the starting resistance is initially all in series with the motor armature, and the field circuit of the regulating dynamo is opened. Under these conditions the field of the motor will be fully excited and the current through the motor armature will be limited by the starting resistance. The starting resistance is then cut out in steps to gradually bring the motor up to its lowest running speed and the higher running speeds are then obtained by adjusting the rheostat in the dynamo field winding circuit to increase the field strength of the regulating dynamo, and consequently increase the speed of the motor.

In such an arrangement where contactors are used, several contactors will be required for cutting out the starting resistance and for certain classes of work, such for instance as elevator work, a considerable number of contactors will be used for cutting out the starting resistance. It is a purpose of my invention to eliminate practically all of the contactors required for starting such a motor. I do this in the following manner: In starting the motor I limit the current flow through the motor armature by use of a starting resistance. In place, however, of accelerating the motor by gradually cutting out the starting resistance, I accelerate the motor by weakening the field of the motor to such an extent as to bring the motor up to its lowest running speed. I then short-circuit the starting resistance in a single step and simultaneously with the short-circuiting of the starting resistance, increase the field strength of the motor just the required amount to prevent any substantial change in the speed of the motor which might otherwise be caused by the increased potential applied to the motor terminals by reason of the short-circuiting of the starting resistance.

My invention will be better understood by reference to Figure 1 wherein the reference characters 5 and 6 indicate the line wires from which the motor M, having the armature 7, receives its power, the motor being connected with the line wires by the double-pole switch S. A starting resistance R connected in series with the armature 7 is designed to limit the initial rush of current through the armature 7 to any desired value. This resistance can be short-circuited through the conductors 8, 9, 10 and the contacts 11, 12, 13 of the relay 14, as will be described later on.

The motor M is provided with a shunt field winding 15 which is connected in series with the armature 16 of the regulating dynamo D to form a field winding circuit which is connected across the line when the switch S is closed. The armature of the regulating dynamo is caused to rotate at a speed constantly proportional to the speed of the armature of the motor by any desired means. In the drawings I have disclosed this means as comprising the shaft 17 upon which both of the armatures are rigidly mounted.

The regulating dynamo is provided with a field winding 18. An adjustable resistance 19 is adapted to be connected in series with the field winding 18 when the relay is actuated to raise its contact 20 against contacts 21 and 22, and a resistance of predetermined value 23 is connected in series with the field winding 18 when the contact 20 of the relay 14 rests upon the contacts 24 and 25, as shown in the drawings.

When the switch S is closed, either manually or automatically, or by any desired means whatever, current flows through the motor armature 7 and the starting resistance R in series. At the same time current will flow through the armature 16 of the regulating dynamo D and the shunt field winding 15 of the motor M. Since at this time the speed of the motor of the regulating dynamo is zero, the field of the motor M will be fully excited. Current will also flow through the regulating dynamo armature 16, the regulating dynamo field winding 18, resistance 23 and contacts 25, 20 and 24, back to the opposite side of the line, thereby giving the regulating dynamo a field, the strength of which depends upon the amount of the resistance 23.

The solenoid s of the relay 14 is connected across the terminals of the motor 7 so that the voltage impressed upon the solenoid s is equal to the counterelectromotive force of the motor armature.

Since the regulating dynamo has a partial field its voltage will increase with the speed of the motor, thereby reducing the field strength of the motor and causing the motor to accelerate. When the motor has reached its lowest running speed, its counterelectromotive force will be just sufficient to start raising the armature of the relay 14, this relay being of the delayed-action type. On the first movement of the armature of the relay 14, contact 20 separates from contacts 24 and 25, thereby opening the circuit of the dynamo field winding, reducing its voltage to substantially zero and increasing the field of the motor to practically full strength. Immediately afterwards or substantially simultaneously therewith, the contact 12 of the relay 14 makes contact with contacts 11 and 13, thereby short-circuiting the starting resistance R. At the same time contact 20 engages contacts 21 and 22, thereby placing the adjustable resistance 19 in series with the field winding 18 and completing the circuit of this field winding. If the rheostat 19 should at this time be adjusted so as to include all of its resistance in series with the field winding 18, the motor would be operated under the same conditions that the motor disclosed in the Stephenson application would operate under immediately after all of the starting resistance has been cut out, namely, full potential impressed upon its armature and full field strength. If at the time the contact 20 engages the contacts 21 and 22 the rheostat 19 is set to include but a part of its resistance in the field winding circuit of the regulating dynamo, the motor will accelerate to the speed corresponding to this setting of the rheostat. By then adjusting the rheostat 19 to exclude its resistance from the field winding circuit 18 the field of the motor M is decreased and its speed increased as desired.

In bringing the motor M to a stop the adjustable rheostat 19 is operated to gradually include all its resistance in the field winding circuit of the regulating dynamo, thereby decreasing the counterelectromotive force of the regulating dynamo and increasing the field strength of the motor, whereupon the motor will act as a generator to return power to the line being driven by the momentum of the apparatus with which it is connected. The speed of the apparatus can thus be reduced down to its lowest running speed. If the relay 14 is designed with a comparatively wide air gap, it will remain closed until the counterelectromotive force of the motor has been reduced to a value much lower than line voltage. It will, of course, be understood that when the speed of the motor M has been reduced to its lowest running speed through regenerated braking the switch S will have to be opened to bring the motor to a complete stop.

The apparatus described above is designed to be used where it may be desirable to adjust the speed of the motor. In Figure 2 I have illustrated means for controlling the operation of the motor where it is not desired to provide any means for adjusting the speed thereof. Such apparatus is particularly desirable for use in connection with apparatus where the motor is controlled by float-controlled or pressure-operated switches and similar automatic devices. In this figure the flow of current from the line wires 5 and 6 to the motor is controlled by a solenoid-operated switch 30, which is in turn controlled by a circuit comprising the switch 31, which is merely conventionally illustrated and may be either a float-controlled switch or a pressure-operated switch, or any other type of switch for closing the circuit through the solenoid 32 of the switch 30, either manually or automatically as may be desired. When the switch 31 is closed, current flows through the armature 7 of the motor M and the starting resistance R in series, just as in Figure 1. This resistance can be short-circuited by the conductors 8, 9, and 10 and the contacts 11, 12 and 13 of the relay 14. The motor is provided with a shunt field 15 which is connected in series with the armature 16 of the regulating dynamo D to form a field winding circuit connected directly across the line, the counter-electromotive force of the regulating dynamo D opposing the voltage of the line. The armature 16 is caused to rotate at a speed proportionate to the speed of the armature 7 by any desired means such as the shaft 17. The regulating dynamo is provided with a field winding 18 which may be connected in series with the resistance 23 or connected directly with one side of the line, depending upon the position of the contact 20 of the relay 14 relative to the contacts 21, 22 and 24, 25.

The operation of the above described apparatus is as follows. When the switch 31 is closed the contactor 30 is actuated to its closed position, thereby permitting current to flow through the armature of the motor M and the resistance R in series. At the same time current will flow through the regulating dynamo and the field winding 15 of the motor, thereby providing full field strength for the motor because at this time the speed of the dynamo is zero. Current will also flow through the regulating dynamo, the field winding 18 thereof and through the resistance 23, thereby causing the field of the regulating dynamo to be partially saturated. The motor at once begins to accelerate and the initial acceleration will be comparatively rapid, because the regulating dynamo will generate a counterelectromotive force which will reduce the field strength of the motor. When the motor M reaches the speed at which it would generate substantially full line voltage with full field excitation, the relay 14 is actuated whereby the contact 20 is separated from the contacts 24 and 25, thereby opening the field circuit of the regulating dynamo causing its voltage to drop to substantially zero, and consequently permitting the field of the motor to build up to substantially full field strength. The relay 14 is so adjusted that its contacts 11 and 13 will be engaged by the contact 12 at substantially the same instant that the field of the motor M is fully established. At the same time contact 20 will engage contacts 21 and 22, thereby re-establishing the field circuit of the regulating dynamo. The motor M will thereupon continue to accelerate until it has reached a predetermined speed, which is determined by the relative design of the motor M and the regulating dynamo D. The rate of acceleration is determined by the rate at which the counterelectromotive force of the regulating dynamo increases relative to the rate at which the counterelectromotive force of the motor M increases.

A fixed resistance 35 may be connected in the field winding circuit of the regulating dynamo in series with the contacts 21 and 22, whereby the maximum speed of the motor can be determined.

While I have described the details of the preferred embodiments of my invention, it is to be clearly understood that my invention is not limited to these details, but is capable of other adaptations and modifications within the scope of the appended claims.

Having thus described my invention, what I claim is:

1. The combination with a motor having a field winding, of a regulating dynamo connected in series with said field winding to form a field winding circuit, a field winding for said regulating dynamo, means for impressing a potential upon said field winding circuit in a direction opposite to the counter-electromotive force of said regulating dynamo, means for causing said regulating dynamo to operate at a speed constantly proportional to the speed of said motor, a starting resistance connected in series with the armature of said motor, a second starting resistance adapted to be connected in series with said regulating dynamo field winding, an adjustable rheostat adapted to be connected in series with said regulating dynamo field winding, means for initially connecting said second named starting resistance in series with said regulating dynamo field winding, and for subsequently consecutively opening the circuit of said dynamo field winding and short-circuiting said first named starting resistance and at the same time re-establishing the circuit of said regulating dynamo field winding through said adjustable rheostat.

2. The combination with a motor having a field winding, of a regulating dynamo connected in series with said field winding to form a field winding circuit, a field winding for said regulating dynamo, means for impressing a potential upon said field winding circuit in a direction opposite to the counterelectromotive force of said regulating dynamo, means for causing said regulating dynamo to operate at a speed constantly proportional to the speed of said motor, a starting resistance connected in series with the armature of said motor, a second starting resistance adapted to be connected in series with said regulating dynamo field winding, an adjustable rheostat adapted to be connected in series with said regulating dynamo field winding, means for connecting said second named starting resistance in series with said regulating dynamo field winding, and for subsequently opening the circuit of said dynamo field winding and short-circuiting said first named starting resistance and at the same time re-establishing the circuit of said regulating dynamo field winding through said adjustable rheostat.

3. The combination with a motor having a field winding, of a regulating dynamo connected in series with said motor field winding to form a field winding circuit, said regulating dynamo having a field winding, means for impressing a potential on said field winding circuit in a direction opposite to the counterelectromotive force of said regulating dynamo, means for causing said regulating dynamo to rotate at a speed constantly proportional to the speed of said motor, a starting resistance connected in series with the armature of said motor, a second starting resistance adapted to be connected in series with said regulating dynamo field winding, means for initially connecting said second resistance in series with said regulating dynamo field winding and for subsequently consecutively opening the circuit of the regulating dynamo field winding and short-circuiting said first named starting resistance and excluding said second named starting resistance from the circuit of said regulating dynamo.

4. The combination with a motor having an armature and a magnetic circuit, of means for impressing a potential on said armature, means for inducing a flux in said magnetic circuit, means for initially limiting the flow of current through said armature, means for reducing the flux through said magnetic circuit, means for subsequently increasing the flux in said magnetic circuit and substantially simultaneously increasing the potential impressed on said armature, and means for subsequently decreasing the flux in said magnetic circuit.

5. The combination with a motor having an armature and a magnetic circuit, of means for impressing a potential on said armature, means for inducing a flux in said magnetic circuit, means for initially limiting the flow of current through said armature, means for reducing flux through said magnetic circuit, and means for subsequently increasing the flux in said magnetic circuit and substantially simultaneously increasing the potential on said armature.

6. The combination with a motor having a field winding, of means for supplying current to said field winding, a starting resistance connected in series with the armature of said motor, means connected with said motor field winding for controlling the flow of current therethrough, means for short-circuiting said starting resistance, and means for controlling said controlling means for reducing the flow of current through said field winding, then increasing the flow of current therethrough, just prior to the short-circuiting of said starting resistance, and subsequently gradually decreasing the flow of current through said motor field winding.

7. The combination with a motor having a field winding, of means for supplying current to said field winding, a starting resistance connected in series with the armature of said motor, means connected with said motor field winding for controlling the flow of current therethrough, means for short-circuiting said starting resistance, and means for controlling said controlling means for reducing the flow of current through said field winding, then increasing the flow of current therethrough just prior to the short-circuiting of said starting resistance.

8. The method of controlling the operation of a motor comprising an armature circuit and a magnetic circuit which comprise initially impressing a potential on said armature circuit and a flow of flux in said magnetic circuit, and substantially simultaneously increasing said potential and said flux in such amounts as to substantially prevent any change in the speed of said motor, and subsequently decreasing the flow of flux to increase the speed of said motor.

9. The method of controlling the operation of a motor comprising an armature circuit and a magnetic circuit which comprise initially impressing a potential on said armature circuit and a flow of flux in said magnetic circuit, and substantially simultaneously increasing said potential and said flux in such amounts as to substantially prevent any change in the speed of said motor.

In witness whereof, I hereunto subscribe my name this 26th day of December, 1919.

HENRY ROSENTHAL.

Witnesses:
EDNA V. GUSTAFSON,
KATHRINE M. GRIFFIN.